No. 833,953. PATENTED OCT. 23, 1906.
G. BROWN.
MACHINE FOR MOLDING CEMENT BRICKS.
APPLICATION FILED MAY 11, 1905. RENEWED MAR. 26, 1906.
2 SHEETS—SHEET 2.
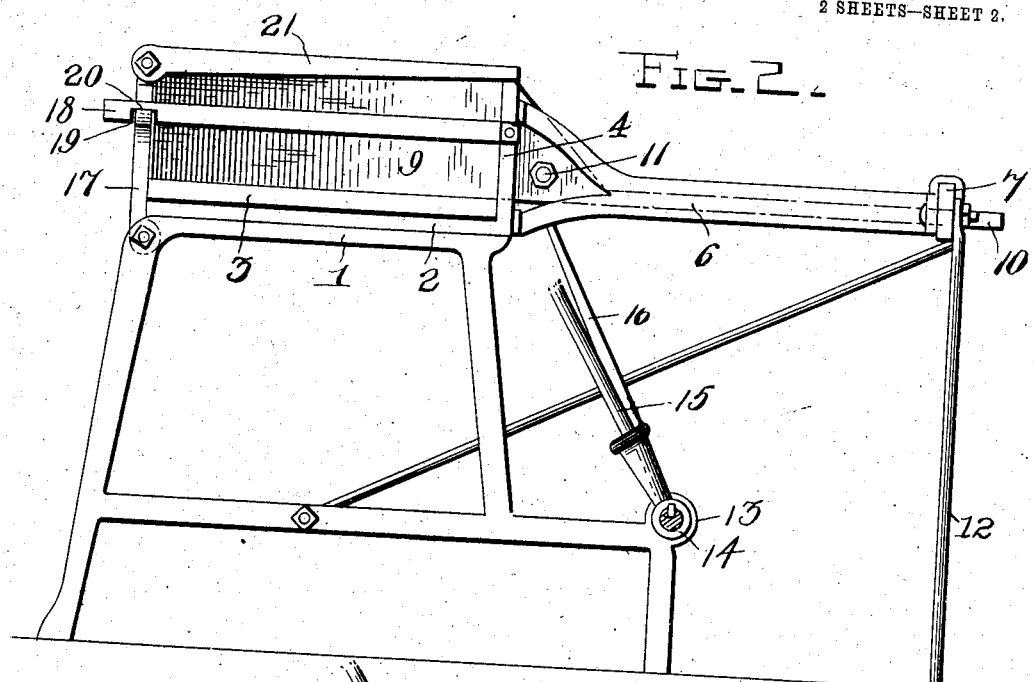
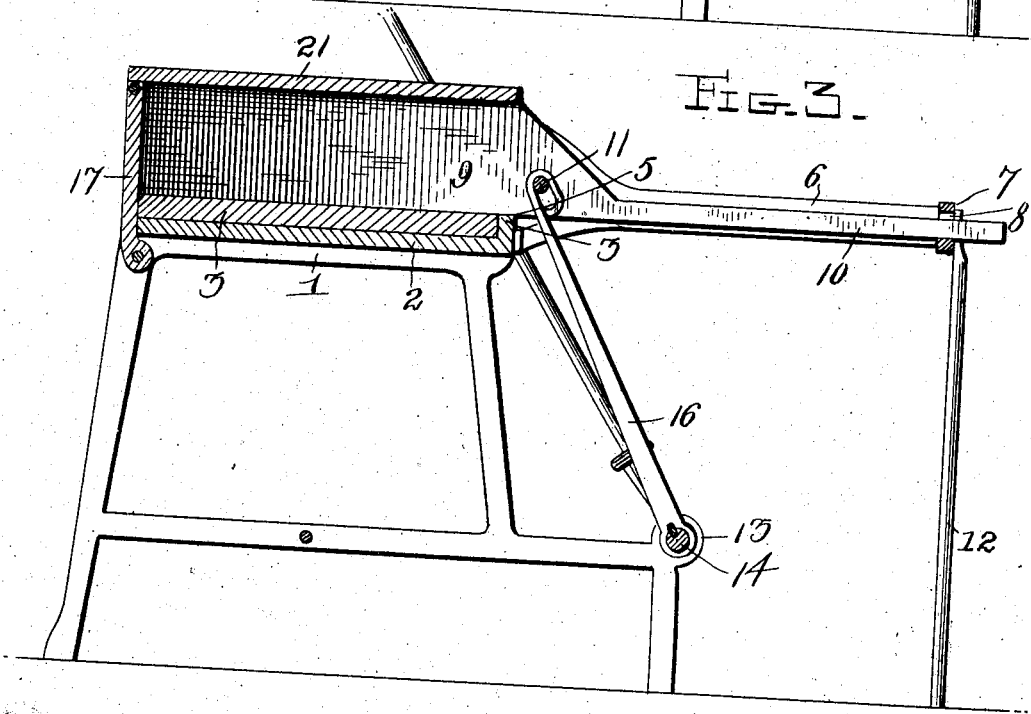

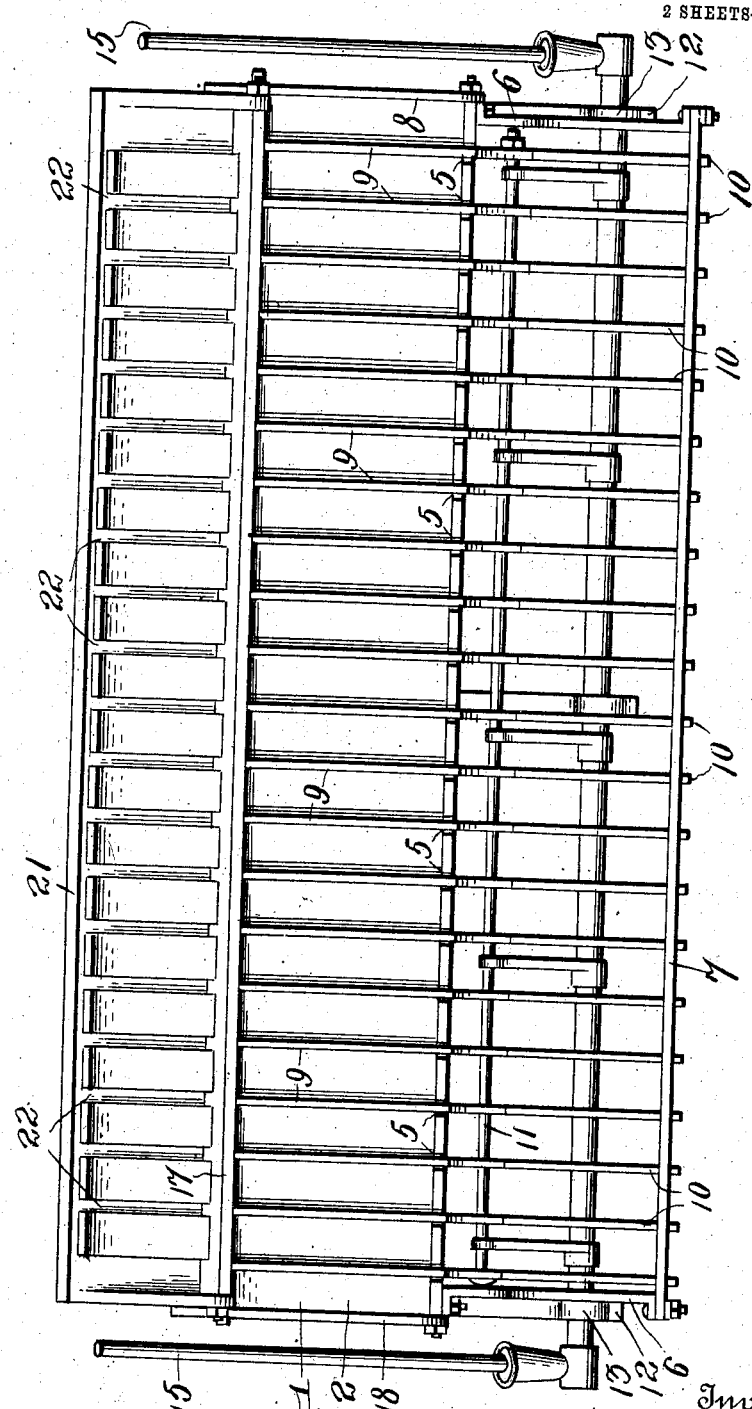

UNITED STATES PATENT OFFICE.

GEORGE BROWN, OF NILES, MICHIGAN, ASSIGNOR, BY MESNE ASSIGNMENTS, TO SOUTH BEND MACHINE MFG. CO., A CORPORATION OF INDIANA.

MACHINE FOR MOLDING CEMENT BRICKS.

No. 833,953.    Specification of Letters Patent.    Patented Oct. 23, 1906.

Application filed May 11, 1905. Renewed March 26, 1906. Serial No. 307,989.

*To all whom it may concern:*

Be it known that I, GEORGE BROWN, a citizen of the United States, residing at Niles, in the county of Berrien and State of Michigan, have invented certain new and useful Improvements in Machines for Molding Cement Bricks; and I do declare the following to be a full, clear, and exact description of the invention, such as will enable others skilled in the art to which it appertains to make and use the same.

My invention is an improved machine for simultaneously molding a number of cement bricks or other similar articles; and it consists in the construction, combination, and arrangement of devices hereinafter described and claimed.

In the accompanying drawings, Figure 1 is a top plan view of a molding-machine embodying my improvements, showing the cover elevated. Fig. 2 is an end elevation of the same, and Fig. 3 is a transverse sectional view of the same.

The table or frame 1 of my improved molding-machine is formed with a bed 2 to support a removable pallet-board 3. On one side of the said bed is a side wall 4, which is fixed and is provided with a number of vertical slots 5, which are appropriately spaced apart, according to the thickness of the bricks or other articles to be molded in the machine. At the ends of the said fixed side wall and projecting outwardly therefrom are a pair of bracket-arms 6, the outer ends of which are connected by a longitudinal bar 7, having openings 8 therein, which are appropriately spaced apart. Sliding partition-plates 9 operate in the slots 5 and are provided at their outer ends with outwardly-extending guide-arms 10, which pass through and operate in the openings 8. Said partition-plates form the side walls of the mold-spaces in which the bricks, blocks, or other articles are formed and serve to space the molded articles apart, as will be readily understood. The said partition-plates have their outer ends connected together by a bar 11. Supporting-legs 12 are here shown for the outer end of the bracket-arm 6 and for the bar 7. At a suitable distance below the said bar 7 the frame or table is provided with bearings 13 for a rock-shaft 14, which is provided with operating-levers 15 at its ends and is also provided with rock-arms 16, which are keyed thereto and are connected to the bar 11, so that by partly turning said rock-shaft by means of one or both of its levers the rock-arms 16 will be caused to move the partition-plates either inwardly or outwardly.

Opposite the fixed side wall 4 is a hinged wall 17, which is adapted to be turned outwardly to a horizontal position and to be raised to a vertical position and parallel with the fixed wall. The pallet-board lies between the fixed and the hinged or pivoted walls, and the latter may be locked in a vertical position by means of lock-bars 18, which are here shown as pivotally connected to the ends of the fixed wall 4 and as provided near their outer ends with lock-notches 19 to engage lock-ears 20, with which the hinged wall is provided. Hingedly connected to the upper side of the hinged wall is a cover 21, which when the hinged wall is in a vertical position is adapted to close onto the fixed wall, and in connection with the pallet-board said fixed and hinged walls and the partition-plates form a plurality of mold-cavities when the partition-plates have been moved inwardly, so that they are caused to extend across the pallet-board and to bear on the upper side therof. The hinged cover 21 has transverse grooves 22 on its under side to engage the upper edges of the partition-plates to retain the latter in parallel relation.

In the operation of my molding-machine after the pallet-board has been placed on the bed, the hinged wall turned to a vertical position and locked, and the partition-plates have been moved inwardly to lie across the pallet-board the cement or other composition is placed and tamped in the mold-spaces, and the cover is then closed, so as to smooth and even or true the upper sides of the mold-arms. When the composition has sufficiently set, one or both of the levers 15 is or are operated to partly turn the rock-shaft 14 and cause the partition-plates to be drawn outwardly from between the molded articles, so as to separate them and leave them on the pallet-board. The cover is then raised and the hinged wall lowered to a horizontal position to permit of the ready removal of the pallet-board, together with the molded articles thereon, from the bed of the machine, the molded articles being retained on the pallet-board until they have sufficiently hardened. A suitable number of pallet-boards may be employed in connection with each machine, so that the latter may be almost continuously in operation.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a molding-machine, a mold embracing a mold-bed, side and top walls inclosing the same, and partition-plates movable into and out of the mold-chamber and coacting with said walls and mold-bed to form a plurality of mold-spaces, one of the side walls being hinged to swing outwardly away from and below the level of said mold-bed.

2. A molding-machine comprising a support and a mold embracing side walls, a removable pallet between the side walls, and partition-plates, one of said side walls being movably mounted so as to be lowered below the level of the pallet and the other wall being slotted, said partition-plates being slidable through the slots of the latter wall, across the pallet and toward and from the movable wall.

3. A molding-machine comprising a support, a fixed wall, a hinged wall, a pallet resting on said support between said walls, and partition-plates extending through the fixed wall and adapted to be moved inwardly across the pallet or outwardly to uncover the same, said movable partition-plates coacting with the pallet and the said walls to form mold-spaces.

4. A molding-machine comprising a mold embracing side walls, one of which is slotted and the other of which is hinged to swing downwardly and outwardly, a removable pallet between said walls and partition-plates sliding through the slots of the slotted wall, across the pallet and toward and from the hinged wall.

5. A molding-machine comprising a support and a mold comprising a mold-bed, side walls, a hinged top wall, and partition-plates, one of said side walls being movably mounted so as to be lowered below the level of the mold-bed and the other wall being slotted, said partition-plates being slidable through the slots of said latter wall, across the bed and toward and from the movable wall.

6. A molding-machine comprising a mold having a mold-bed, a fixed wall provided with vertical slots at suitable distances apart, and a movable wall opposite the slotted wall mounted to be lowered below the level of the mold-bed, longitudinally-movable partition-plates in said slots adapted to be moved inwardly across the bed and to be moved outwardly to clear the bed, guides for said partition-plates and means to simultaneously operate said partition-plates.

7. A molding-machine comprising a mold embracing a mold-bed, side walls, one of which is slotted and the other of which is hinged to swing downwardly and outwardly, partition-plates sliding through the slots of the slotted wall, across the bed and toward and from the hinged wall, swinging locking-bars adapted to engage the hinged wall to lock the latter in its closed position, and a hinged top wall.

8. A molding-machine comprising a mold embracing side walls, a mold-bed between said side walls and a hinged top wall, one of said side walls being fixed and the other being movably mounted so as to be lowered below the level of the mold-bed.

9. The herein-described molding-machine comprising the table or frame having the bed, the fixed vertically-slotted side wall and the projecting bracket-arms, the side wall hinged to the table or frame, the cover, the bar connecting the bracket-arms and having openings coincident with the slots in the fixed side wall, the partition-plates movable in the slots in the fixed side wall and having the guide-arms extending through the openings in the bar, and the pallet-board on the bed, under the partition-plates and removable from the bed.

10. The herein-described molding-machine comprising the table or frame having the bed, the fixed vertically-slotted side wall and the projecting bracket-arms, the side wall hinged to the table or frame, the cover hinged to the said hinged wall, the bar connecting the bracket-arms and having openings coincident with the slots in the fixed side wall, the partition-plates movable in the slots in the fixed side wall and having the guide-arms extending through the openings in the bar, the pallet-board on the bed, under the partition-plates and removable from the bed, the shaft mounted in bearings in the table or frame, a lever to rock said shaft, and rock-arms projecting from said shaft and connected to the partition-plates to simultaneously operate the latter.

In testimony whereof I have hereunto set my hand in presence of two subscribing witnesses.

GEORGE BROWN.

Witnesses:
WILBER N. BURNS,
GRACE S. BURNS.